United States Patent [19]
Faibish et al.

[11] Patent Number: 5,467,273
[45] Date of Patent: Nov. 14, 1995

[54] LARGE AREA MOVEMENT ROBOT

[75] Inventors: Sorin Faibish; Giora Yahav, both of Haifa; Shlomo Djerassi, Nahariya, all of Israel

[73] Assignee: State of Israel, Ministry of Defence, Rafael Armament Development Authority, Haifa, Israel

[21] Appl. No.: 3,230

[22] Filed: Jan. 11, 1993

[30] Foreign Application Priority Data

Jan. 12, 1992 [IL] Israel ..................................... 100.633

[51] Int. Cl.$^6$ .................................................. G06F 165/00
[52] U.S. Cl. .................... 364/424.02; 364/449; 364/460; 180/169; 356/5.01
[58] Field of Search ............................. 364/424.02, 449, 364/460, 456, 448, 561, 559; 318/587; 356/3, 5, 17; 250/203.1, 203.2; 180/167, 168, 169

[56] References Cited

U.S. PATENT DOCUMENTS

| | | | |
|---|---|---|---|
| 4,218,172 | 8/1980 | Freund | 414/730 |
| 4,307,891 | 12/1981 | Doornick | 280/1.22 |
| 4,453,085 | 6/1984 | Pryor | 250/203 R |
| 4,647,784 | 3/1987 | Stephens | 250/561 |
| 4,788,441 | 11/1988 | Laskowski | 280/561 |
| 4,811,228 | 3/1989 | Hyyppa | 364/424.02 |
| 4,817,000 | 3/1989 | Eberhardt | 364/443 |
| 4,829,172 | 5/1989 | Miller | 250/205 |
| 4,941,106 | 7/1990 | Krieger | 395/94 |
| 4,967,064 | 10/1990 | Field et al. | 250/203.2 |
| 5,005,128 | 4/1991 | Robins et al. | 364/424.02 |
| 5,011,288 | 4/1991 | Noji et al. | 356/375 |
| 5,051,906 | 9/1991 | Evans et al. | 364/424.02 |
| 5,068,795 | 11/1991 | Kamimura et al. | 364/449 |
| 5,155,684 | 10/1992 | Burke et al. | 364/424.02 |
| 5,170,352 | 12/1992 | McTamaney et al. | 364/424.02 |
| 5,202,742 | 4/1993 | Frank et al. | 356/5 |

OTHER PUBLICATIONS

"Mobile Robot Localization by Tracking Geometric Beacons" by J. Leonard et al., IEEE Transaction Jun., 1991.
"A Unified Approach for Robot Motion Planning With Moving Polyhedral Obstacles" by Ching Long Shih et al., IEEE, Jul. 1990.
"A Positioning System for Mobile Robots Using Symmetrical Rotating Laser Beams", by T. Ochi, Advanced Robotics, vol. 4, 1990.
"Intelligent Navigation For An Autonomous Mobile Robot", by E. Rodin et al., IEEE, Sep. 1989.
"Edge Distribution Understanding For Locating A Mobile Robot", by Nakamura, SPIE Mobile Robots, 1988.
"On Terrain Model Acquisition by a Point Robot Amidst Polyhedral Obstacles", by N. S. V. Rao, IEEE Aug. 1988.
"An Optical Rangefinder For Autonomous Robot Cart Navigation", G. Miller et al., SPIE vol. 852, 1987.
"Real-time Cooperative Interaction Between Structured-light and Reflectance Ranging for Robot Guidance", by E. Kent et al., Robotica, vol. 3, Nov. 1985.
Pattern Classification and Scene Analysis, Duda et al., pp. 305-328, John Wiley & Sons, no publication date.
H. S. Baird, Model-Based Image Matching Using Location, MIT Press, Mass., pp. 5-9 and 14-27, no publication date.
C. Munteanu and G. Trottier "Area Correlation Techniques in Remotely Piloted Vehicle Guidance", Report CRDV-4134-79, Quebec, Mar. 1979.

Primary Examiner—Michael Zanelli
Attorney, Agent, or Firm—Helfgott & Karas

[57] ABSTRACT

A large area movement robot including a chassis, controllable apparatus for displacement of the chassis, navigation apparatus for controlling the operation of the controllable apparatus, the navigation apparatus comprising a scanning range finder mounted on the chassis, apparatus associated with the scanning range finder for determining the azimuthal orientation of a retroreflecting object whose range is simultaneously determined by the scanning range finder and apparatus responsive to the sensed range and angular orientation of the retroreflecting object for providing operating instructions to the controllable apparatus.

7 Claims, 7 Drawing Sheets

LARGE AREA MOVEMENT ROBOT

FIELD OF THE INVENTION

The present invention relates to robots generally and more particularly robots adapted for large area movement.

BACKGROUND OF THE INVENTION

There exists a great deal of literature relating to the localization and navigation of mobile robots in indoor and outdoor environments. Examples of such literature include the following references, the disclosures of which are hereby incorporated by reference:

E. W. Kent et al, Real-Time Cooperative Interaction between Structured-Light and Reflectance Ranging for Robot Guidance, Robotica, Vol. 3, Nov 1, pp. 7–11, 1985;

G. L. Miller et al, An Optical Rangefinder for Autonomous Robot Cart Navigation, SPIE Mobile Robots II, Vol. 852, pp. 132–144, 1987.

N. S. V. Rao et al, On Terrain Model Acquisition by a Point Robot Amidst Polyhedral Obstacles, IEEE Journal of Robotics and Automation, Vol. 4, No. 4, pp. 450–455, August, 1988;

T. Nakamura, Edge Distribution Understanding For Locating a Mobile Robot, SPIE Mobile Robots III, Vol. 1007, pp 195–202, 1988;

E. Y. Rodin et al, Intelligent Navigation for an Autonomous Mobile Robot, Proc. of the 28th IEEE Conference on Decision and Control, Ft. Lauderdale, pp. 366–369, December, 1989; T. Ochi, A Positioning System for Mobile Robots Using Symmetrical Rotating Laser Beams, Advanced Robotics, Vol. 4, No. 3, pp. 217–220, 1990;

C. L. Shih, et al, A Unified Approach for Robot Motion Planning with Moving Polyhedral Obstacles, IEEE Trans on Systems, Man and Cybernetics, Vol. 20, No. 4, July/August 1990;

J. J. Leonard et al, Mobile Robot Localization by Tracking Geometric Beacons, IEEE Trans. on Robotics and Automation, Vol. 7, No. 3, June, 1991.

U.S. Pat. No. 5,005,128 Automated Vehicle Guidance System;

U.S. Pat. No. 4,829,172 Optical Ranging System Using Phase Shift Measurements;

U.S. Pat. No. 4,788,441 Range Finder for e.g. Automatic Guided Vehicle.

SUMMARY OF THE INVENTION

The present invention seeks to provide an improved, economical large area movement robot. Such a robot may be useful for a variety of tasks, for example, cleaning floors, security patrols, and transportation of supplies in hospitals, offices and warehouses.

There is thus provided in accordance with a preferred embodiment of the present invention a large area movement robot including a chassis, controllable apparatus for displacement of the chassis, navigation apparatus for controlling the operation of the controllable apparatus, the navigation apparatus comprising:

a scanning range finder mounted on the chassis;

apparatus associated with the scanning range finder for determining the azimuthal orientation of a retroreflecting object whose range is simultaneously determined by the scanning range finder; and apparatus responsive to the sensed range and angular orientation of the retroreflecting object for providing operating instructions to the controllable apparatus.

Additionally in accordance with a preferred embodiment of the present invention there is provided a large area movement robot including a chassis, controllable apparatus for displacement of the chassis, navigation apparatus for controlling the operation of the controllable apparatus, the navigation apparatus comprising:

a plurality of selectably placeable retroreflectors;

a scanning range finder mounted on the chassis;

apparatus associated with the scanning range finder for determining the azimuthal orientation of a retroreflecting object whose range is simultaneously determined by the scanning range finder; and apparatus responsive to the sensed range and angular orientation of the retroreflecting object for providing operating instructions to the controllable apparatus.

In accordance with a preferred embodiment of the present invention the scanning range finder includes apparatus for range finding according to time of flight.

Additionally in accordance with a preferred embodiment of the present invention, the scanning range finder is operative for sensing distances as small as 0.5 meter.

Further in accordance with a preferred embodiment of the present invention, the apparatus for providing operating instructions comprises apparatus for sensing the distance and angular orientations with respect to a plurality of retroreflectors and apparatus for providing operating instructions in response to information combining the sensed distances and angles with respect to the plurality of retroreflectors.

Further in accordance with a preferred embodiment of the present invention said scanning range finder is operative for sensing distances as small as 0.5 meter and as great as 100 meters.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
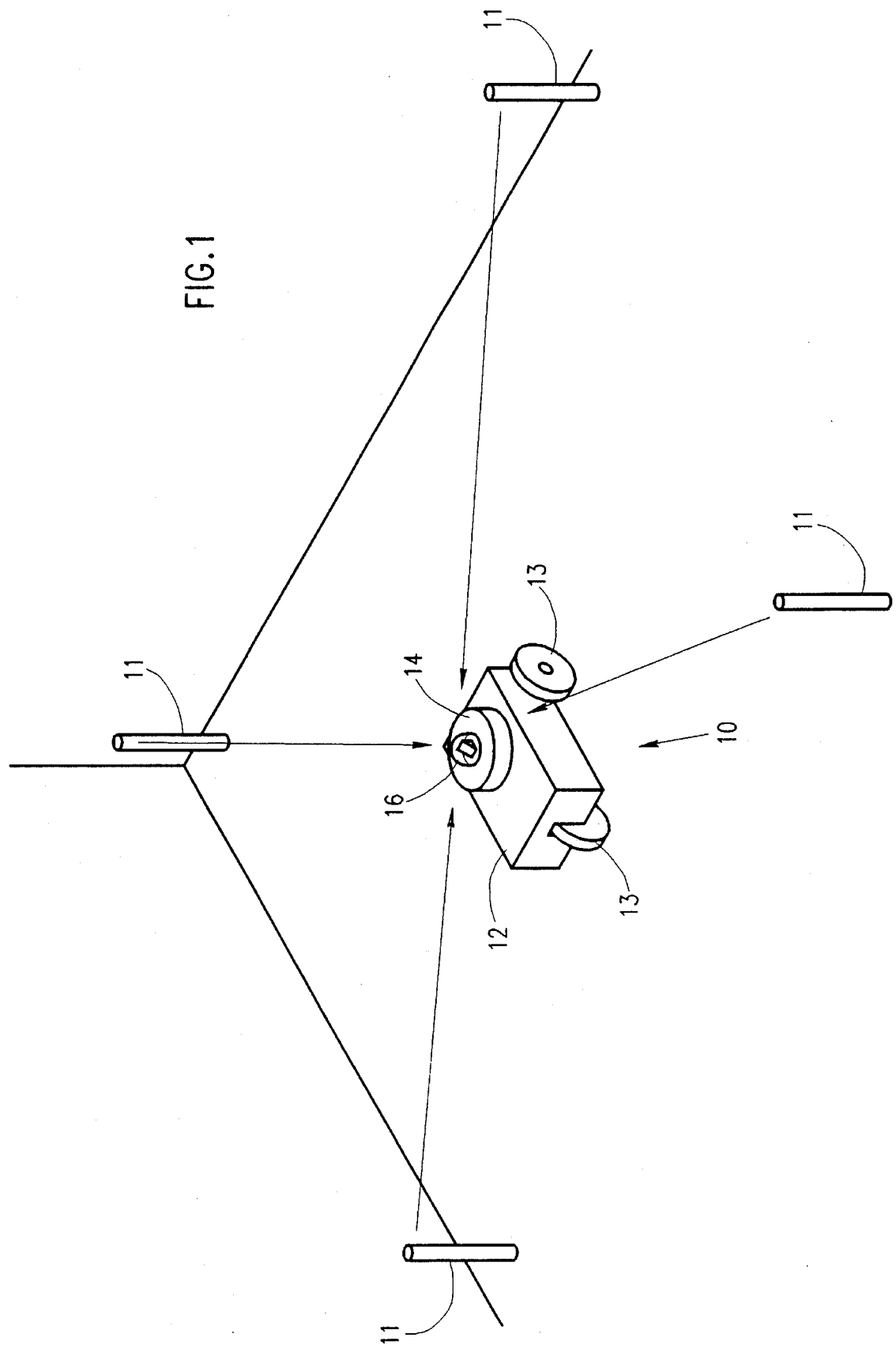
FIG. 1 is a generalized illustration of a large area movement robot system constructed and operative in accordance with a preferred embodiment of the present invention.

Reference is now made to FIG. 1, which illustrates a large area movement robot system constructed and operative in accordance with a preferred embodiment of the present invention and which includes a large area movement robot 10 which is arranged to operate in an area delineated by a plurality of retroreflecting posts 11.

As illustrated generally in FIG. 1, the large area movement robot 10 comprises a chassis 12 which is supported on drive wheels 13 and which may support any suitable operational apparatus such as floor cleaning apparatus, such as washing, waxing, sweeping or buffing apparatus. Also supported on chassis 12 is guidance apparatus 14, which will be described in greater detail hereinbelow and which includes an optical guidance head 16.

Figure 2:
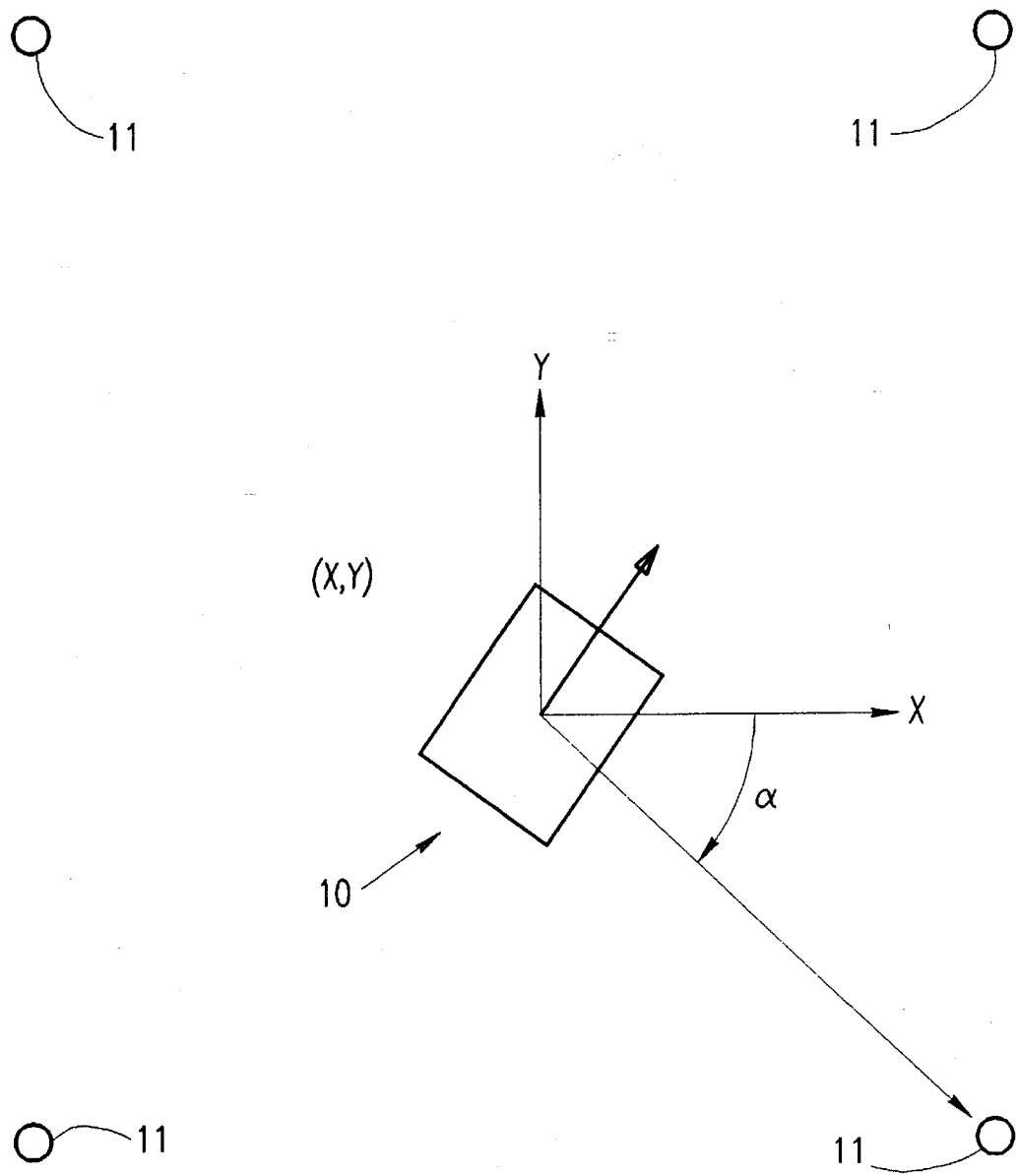
FIG. 2 is a vector diagram illustrating the positional calculation of the robot in the system of FIG. 1.
Figure 7:
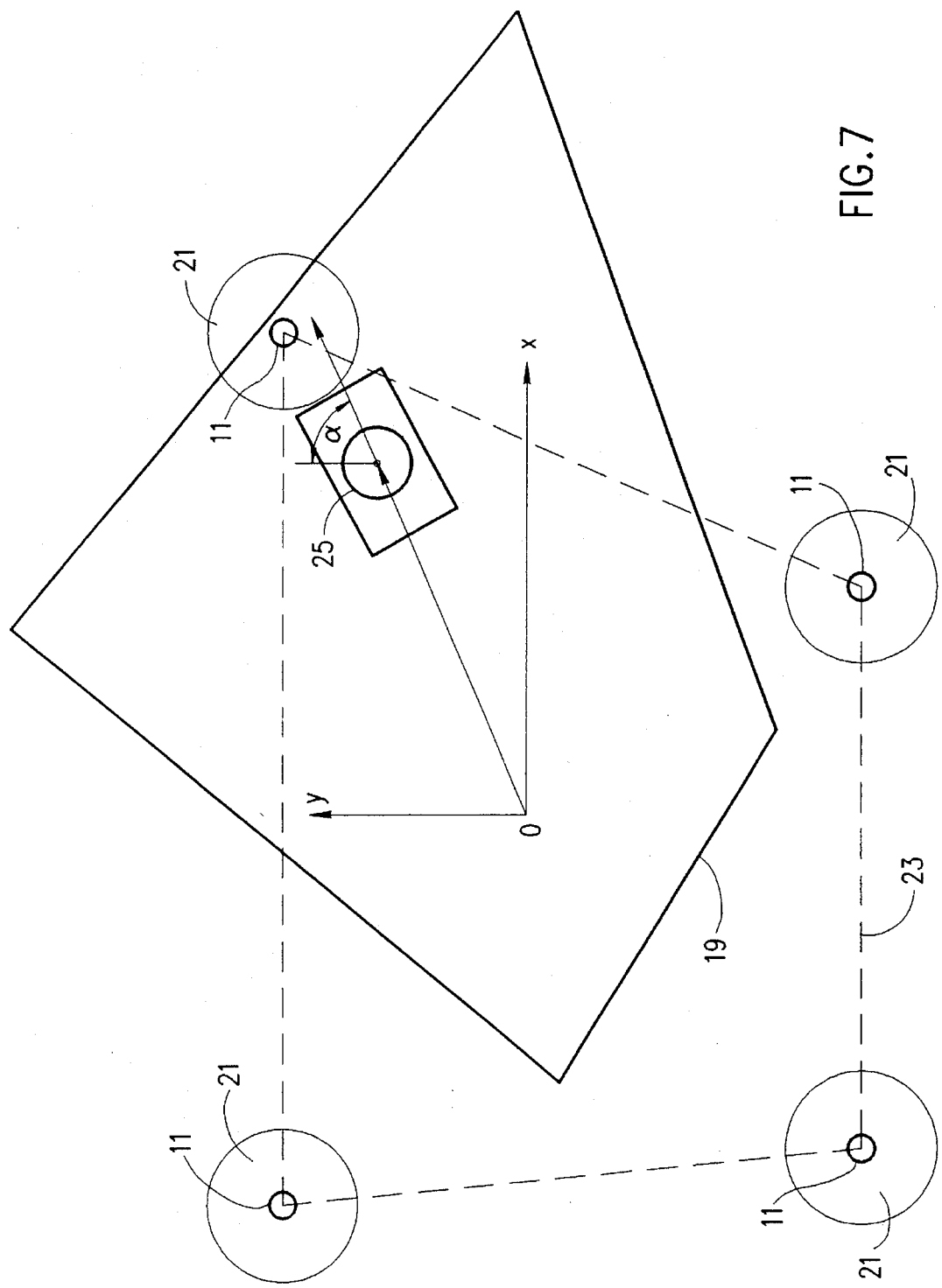
FIG. 7 is an illustration of the operation of a preferred navigation technique employed by the apparatus of the present invention.

Referring now to FIGS. 2 and 7, it may be appreciated that in general navigation of the robot 10 is performed by means of determining the angle alpha between a frame of reference established with respect to the robot chassis and a vector extending from the robot to various retroreflecting posts 11, which are also termed "targets".

A preferred navigation technique which may be used by the apparatus of the present invention is based on template matching between initial locations of a plurality of reference targets and their subsequent measured locations. This technique is described generally in the following references:

H. S. Baird, Model-Based Image Matching Using Location, MIT Press, Cambridge, Mass.;

R. O. Duda et al, Pattern Classification and Scene Analysis. John Wiley & Sons, pp. 276–284 and pp 305–328.

The disclosures of the foregoing references are hereby incorporated herein by reference.

The basic steps of the algorithm are as follows:

When the robot is first activated, the locations of all the targets with respect to the initial position of the robot are measured. The range and angle data for each target is sampled and stored in a map form. The map of the target locations is preferably in a planar geometrical form represented by a Cartesian coordinate system having as its center, the initial robot location and its reference direction, the initial heading of the robot. This map represents the reference template.

At each step in the navigation, the location (range and angle) of each target is measured relative to the current robot position and orientation and represented in same Cartesian coordinate system as the reference template, and defines a current template.

Each current template is compared with the reference template preferably by using covariance template matching for determining the relative translation (x,y) and rotation (alpha) between the two templates, generally as taught in the following reference, the teaching of which is hereby incorporated herein by reference:

C. Munteanu and G. Trottier, Area Correlation Techniques in Remotely Piloted Vehicle Guidance, Report CRDV-4134-79, Canadian Defence Research Establishment Valcartier (Quebec), GRAI-7920, March 1979.

A translation vector (x,y) defines the position of the robot with respect to its initial position, i.e. the position of the robot with respect to the plurality of targets. This is the absolute location of the robot with respect to the targets, as illustrated in FIG. 7.

A rotation angle (alpha) defines the orientation of the robot with respect to the initial heading of the robot with respect to the targets. This is the absolute orientation of the robot with respect to the targets.

The position and heading of the robot may be used for robot position correction with respect to a precomputed nominal position along a robot trajectory.

The template matching process is illustrated in FIG. 7. An initial template 19 is estimated with uncertainty regions 21 for each location of a target 11. At each step of the process, a new template 23 is generated. By matching the initial template 19 and each new template 23, the robot position (x,y) and heading (alpha) with position uncertainty defined by a robot uncertainty region 25. The template matching process includes finding the translation and rotation transformation matrices between the two Cartesian orthonormal coordinate systems represented by the initial and new templates, using conventional techniques.

Figure 3:
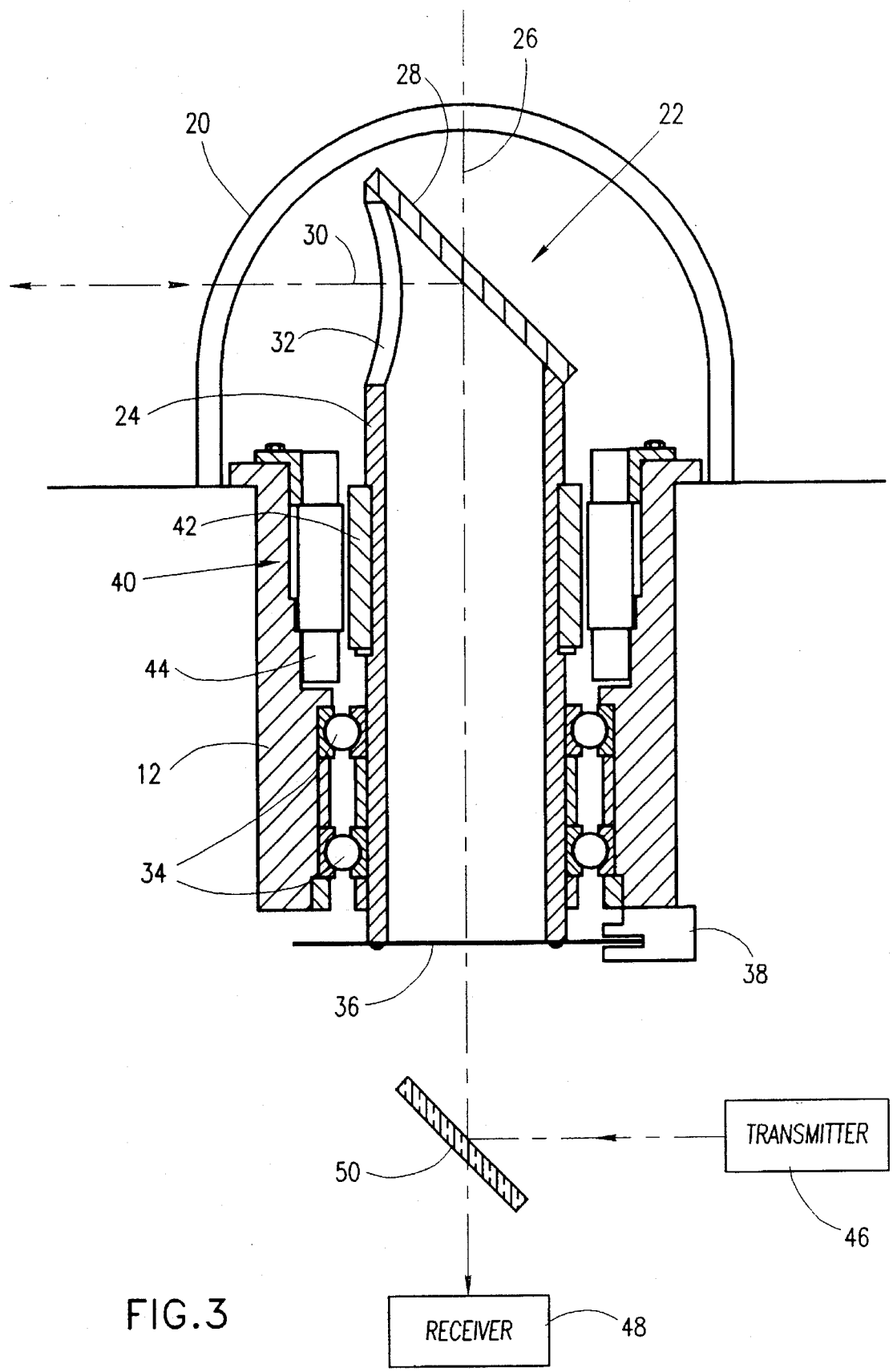
FIG. 3 is a simplified illustration of part of the robot of FIG. 1 in accordance with one preferred embodiment of the invention.

Reference is now made to FIG. 3, which illustrates one preferred embodiment of optical guidance head useful in the robot system of the present invention. In this embodiment, disposed within a light transmissive dome 20 there is provided a rotatable periscope type reflector assembly 22, preferably comprising a hollow tube 24 onto which is mounted in slanted orientation with respect to the axis 26 of the tube a light reflector 28, with which light communicates generally vertically parallel to axis 26 and generally horizontally along an axis 30 generally perpendicular to axis 26, via a window 32 formed in tube 24.

Tube 24 is preferably bearing mounted onto chassis 12 by means of bearings 34 and has mounted thereon a rotational encoder disk 36 which cooperates with a reader 38 which is mounted on chassis 12. Desired rotation of tube 24 about axis 26 relative to chassis 12, which produces rotation of axis 30 in azimuth, may be provided by means of a rotary actuator 40, which may comprise a stepper motor whose rotor 42 may be fixed to tube 24 and whose stator 44 may be fixed to chassis 12, as illustrated.

A transmitter 46 and a receiver 48 may communicate via rotatable reflector assembly 22 via a beam splitter 50, which may be of any suitable construction.

Figure 4:
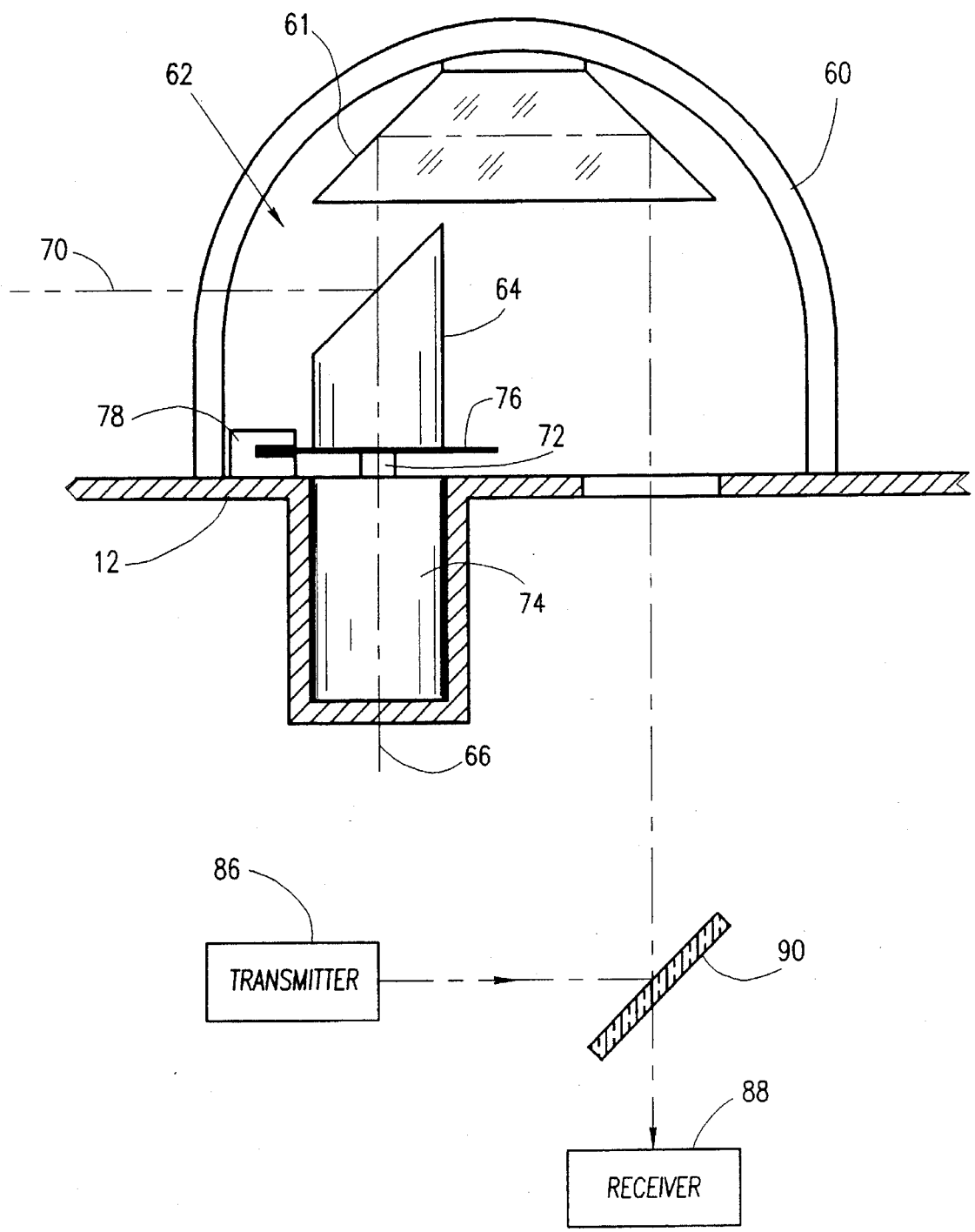
FIG. 4 is a simplified illustration of part of the robot of FIG. 1 in accordance with another preferred embodiment of the invention.

Reference is now made to FIG. 4, which illustrates another embodiment of the optical guidance head useful in the robot system of the present invention. In this embodiment, disposed within a light transmissive dome 60 there is provided a prism 61 which reflects light to and from a rotatable reflector assembly 62, preferably comprising a hollow tube 64 onto which is mounted in slanted orientation with respect to the axis 66 of the tube a partial light reflector or beam splitter 90, with which light communicates generally vertically parallel to axis 66 and generally horizontally along an axis 70 generally perpendicular to axis 66.

Tube 64 is preferably mounted onto the shaft 72 of a stepper motor 74 which is fixedly mounted onto chassis 12 and has mounted thereon a rotational encoder disk 76 which cooperates with a reader 78 which is mounted on chassis 12. Desired rotation of tube 64 about axis 66 relative to chassis 12, which produces rotation of axis 70 in azimuth, may be provided by operation of stepper motor 74.

A transmitter 86 and a receiver 88 may communicate via rotatable reflector assembly 62 via a beam splitter 90, which may be of any suitable construction.

Figure 5:
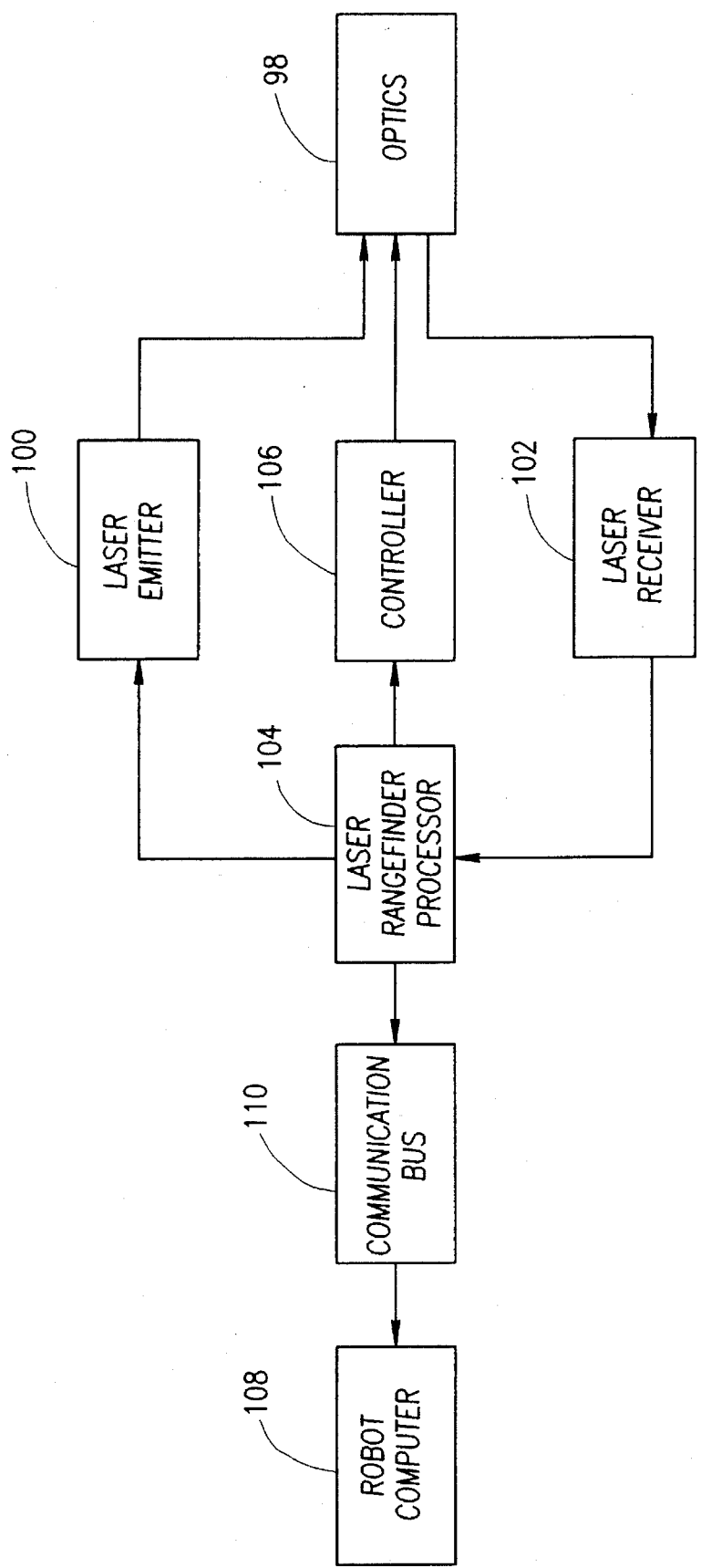
FIG. 5 is a simplified block diagram illustration of the electro-optical portion of the robot of FIGS. 1–4.

Reference is now made to FIG. 5, which illustrates in generalized block diagram form electrooptical apparatus forming part of the guidance apparatus 14 (FIG. 1). The guidance apparatus comprises communication optics 98, of which the apparatus of FIGS. 3 or 4 form part, and through which a laser emitter 100 and laser receiver 102 communicate.

The laser emitter 100 and the laser receiver 102 communicate with a laser rangefinder processor 104, such as a Intel 8051 microprocessor which also operates the scanning optics 98 via a controller 106, such as a power operational amplifier—APEX OP21, an encoder Hewlett Packard HEDS-5540 and a controller HP HCTL-2000. For example, azimuth aiming instructions to the optics described in FIGS. 3 and 4 may be provided by processor 104 via controller 106. An onboard robot computer 108, such as Intel 80286 and 80287 microprocessors communicates with the laser rangefinder processor 104 via a communications bus 110.

Figure 6:
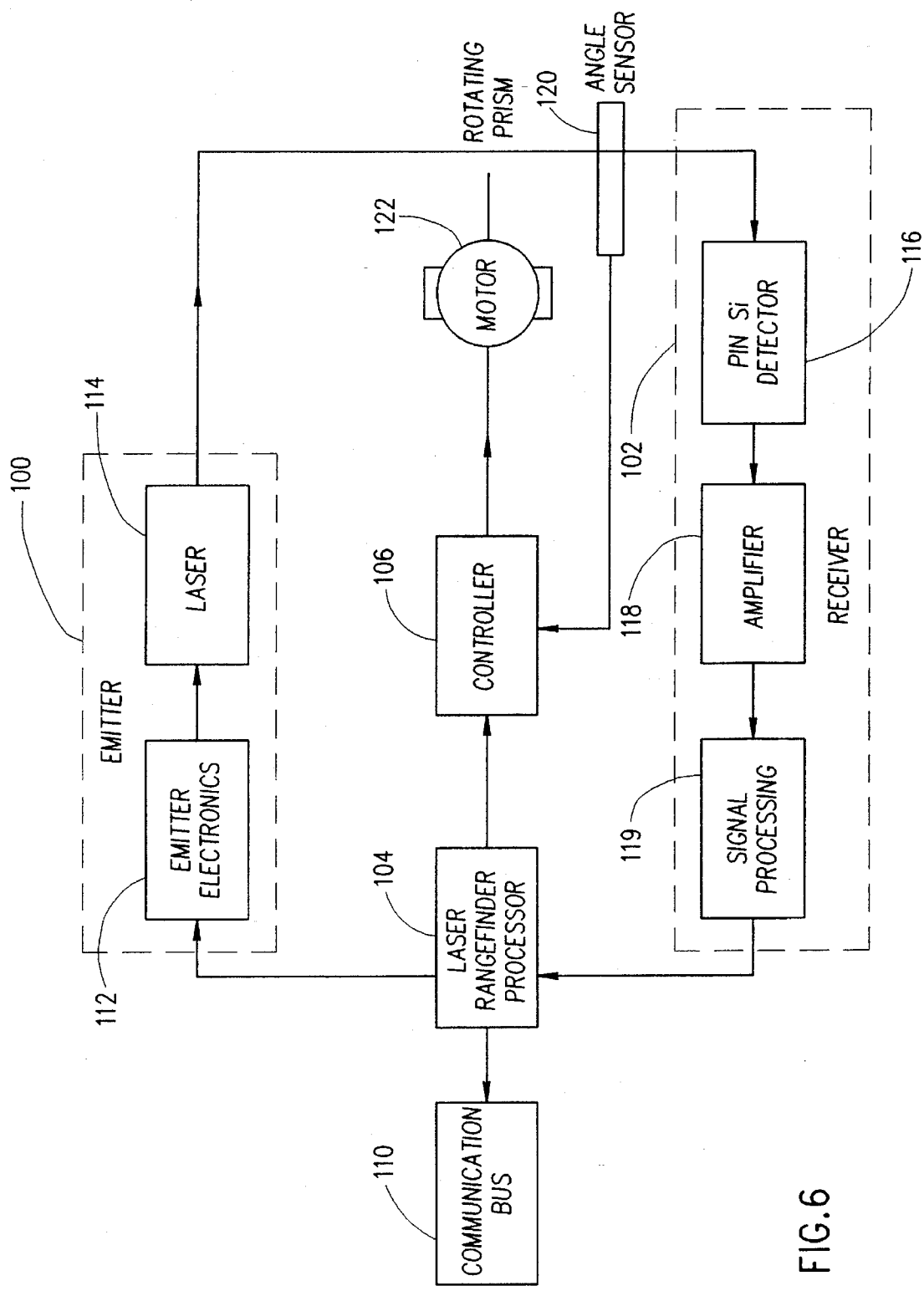
FIG. 6 is a more detailed block diagram illustration of the apparatus of FIG. 5.

Reference is now made to FIG. 6, which illustrates parts of the apparatus of FIG. 5 in greater detail. It is seen that the laser emitter typically comprises emitter electronics 112, such as a trigger and pulse modulator circuit which in turn provides a current signal which drive a laser 114, such as a RCA-C86091E laser diode.

FIG. 6 also indicates that the laser receiver preferably comprises a detector such as a PIN detector 116 which outputs via an amplifier 118 to signal processing circuitry 119, which in turn outputs to laser rangefinder processor 104. It is also seen that controller 106 receives an input from an angle sensor 120, such as a rotary encoder and provides control outputs to a motor 122, such as a stepping motor, which operates to rotate a rotating reflector assembly 22 or 62 (FIGS. 3 and 4).

It will be appreciated by persons skilled in the art that the present invention is not limited by what has been shown and described hereinabove. Rather the scope of the present invention is defined only by the claims which follow.

We claim:

1. A large area movement robot for displacement within a region delimited by a plurality of retroreflecting objects, the robot comprising:
   a chassis;
   a controllable apparatus operative to displace the chassis within the region delimited by the plurality of retroreflecting objects;
   a learning navigator operative to control the operation of the controllable apparatus, said navigator comprising:
   a scanning range finder mounted on the chassis and operative to measure initial azimuthal orientations and ranges of a plurality of retroreflecting objects;
   an azimuth and range matching device associated with the scanning range finder operative to determine the current azimuthal orientation of the plurality of retroreflecting objects whose ranges are determined by the scanning range finder and matching the azimuthal orientations and ranges with initial azimuthal orientations and ranges of said plurality of retroreflecting objects; and
   a self-position computation unit responsive to the output of the azimuth and range matching device and operative to provide operating instructions to the controllable apparatus.

2. The large area movement robot according to claim 1 and wherein said scanning range finder includes apparatus for range finding according to time of flight of a laser pulse.

3. A large area movement robot comprising:
   a chassis;
   controllable apparatus operative to displace the chassis within a region;
   a learning navigator operative to control the operation of the controllable apparatus, said navigator comprising:
   a plurality of selectably placeable retroreflectors delimiting a region;
   a scanning range finder mounted on the chassis and operative to measure initial azimuthal orientations and ranges of the plurality of retroreflectors;
   an azimuth and range matching device associated with the scanning range finder and operative to determine the azimuthal orientation of the plurality of retroreflectors whose ranges are determined by the scanning range finder and matching the azimuthal orientations and ranges with initial azimuthal orientations and ranges of said plurality of retroreflecting objects; and
   a self-position computation unit responsive to the output of the azimuth and range matching device and operative to provide operating instructions to the controllable apparatus.

4. The large area movement robot according to claim 3 and wherein said scanning range finder includes apparatus for range finding according to time of flight of a laser pulse.

5. A navigation apparatus operative to control the operation of a chassis displacement device, said navigation apparatus comprising:
   a scanning range finder mounted on the chassis;
   an azimuth and range matching device associated with the scanning range finder and operative to determine the azimuthal orientation of a plurality of retroreflecting objects whose ranges are simultaneously determined by the scanning range finder and matching the azimuthal orientations and ranges with learned azimuthal orientations and ranges of said plurality of retroreflecting objects; and
   a self-position computation unit responsive to the output of the azimuth and range matching device and operative to provide operative instructions to the chassis displacement device.

6. A navigation apparatus comprising:
   a reference template memory operative to store a reference template comprising range and angular azimuthal orientation data for a plurality of retroreflective objects at an initial time t0;
   a ranging device for providing current range and angular orientation values of the plurality of retroreflective objects; and
   a self-position computing device operative to repeatedly receive the current range and angular orientation values of the plurality of retroreflective objects and to repeatedly compute the position and angular orientation of the navigation apparatus by comparing the received ranges and angular orientations to the reference template.

7. The navigation apparatus according to claim 6 and wherein said ranging device comprises:
   a laser source emitting pulsed light comprising a sequence of light pulses;
   a scanner operatively associated with the laser and operative to direct the pulsed light toward a plurality of locations;
   a photodiode operative to detect light reflected back from the plurality of retroreflective objects;
   a range finder operative to determine ranges of the plurality of retroreflective objects; and
   an angle sensor operative to measure the angular orientation of an individual retroreflective object encountered by a pulse at the time the pulse returns to the photodiode.

* * * * *